(12) United States Patent
Filgas et al.

(10) Patent No.: US 9,726,820 B2
(45) Date of Patent: Aug. 8, 2017

(54) END PUMPED PWG WITH TAPERED CORE THICKNESS

(71) Applicant: RAYTHEON COMPANY, Waltham, MA (US)

(72) Inventors: David M. Filgas, Newbury Park, CA (US); Robert D. Stultz, Cypress, CA (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

(21) Appl. No.: 14/682,539

(22) Filed: Apr. 9, 2015

(65) Prior Publication Data

US 2016/0047981 A1 Feb. 18, 2016

Related U.S. Application Data

(60) Provisional application No. 62/037,505, filed on Aug. 14, 2014.

(51) Int. Cl.
*G02B 6/26* (2006.01)
*G02B 6/42* (2006.01)
(Continued)

(52) U.S. Cl.
CPC ....... *G02B 6/1228* (2013.01); *G02B 6/12007* (2013.01); *G02B 6/4296* (2013.01); *G02B 6/4298* (2013.01); *H01S 3/0617* (2013.01); *H01S 3/0632* (2013.01); *H01S 3/0637* (2013.01); *G02B 2006/12159* (2013.01); *H01S 3/042* (2013.01); *H01S 3/0625* (2013.01);
(Continued)

(58) Field of Classification Search
CPC ........ G02B 6/1228; G02B 6/14; G02B 6/305; G02B 6/0028; G02B 2006/12195
USPC .... 385/28, 30, 43, 49, 129–132; 372/21, 45, 372/50
See application file for complete search history.

(56) References Cited

U.S. PATENT DOCUMENTS 5,846,638 A 12/1998 Meissner
6,418,156 B1 7/2002 Peressini
(Continued)

FOREIGN PATENT DOCUMENTS

EP 1 763 116 A1 3/2007

OTHER PUBLICATIONS

Written Opinion of the International Searching Authority for International Application No. PCT/US2015/045151 filed Aug. 13, 2015, Written Opinion of the International Searching Authority mailed Nov. 12, 2015 (8 pgs.).
(Continued)

*Primary Examiner* — Kaveh C Kianni
*Assistant Examiner* — Hung Lam
(74) *Attorney, Agent, or Firm* — Lewis Roca Rothgerber Christie LLP

(57) ABSTRACT

A planar wave guide (PWG) having a first end for coupling to a light pump and a second end opposite to the first end and including a first cladding layer; a second cladding layer; and a uniformly doped core layer between the first cladding layer and the second cladding layer, wherein the core layer is tapered having a smaller thickness at the first end and a larger thickness at the second end, and wherein a ratio of the core thickness to thickness of the cladding layers is smaller at the first end and larger at the second end.

11 Claims, 3 Drawing Sheets

(51) Int. Cl.
  G02B 6/10 (2006.01)
  G02B 6/122 (2006.01)
  G02B 6/12 (2006.01)
  H01S 3/063 (2006.01)
  H01S 3/06 (2006.01)
  H01S 3/08 (2006.01)
  H01S 3/0941 (2006.01)
  H01S 3/042 (2006.01)
  H01S 3/16 (2006.01)

(52) U.S. Cl.
  CPC ....... *H01S 3/08072* (2013.01); *H01S 3/09415* (2013.01); *H01S 3/1643* (2013.01)

(56) References Cited

U.S. PATENT DOCUMENTS

| | | | |
|---|---|---|---|
| 6,462,891 B1 | 10/2002 | Fukumoto et al. | |
| 6,580,850 B1* | 6/2003 | Kazarinov | G02B 6/12004 385/16 |
| 6,934,313 B1 | 8/2005 | Deacon | |
| 8,027,555 B1 | 9/2011 | Kliner et al. | |
| 8,111,724 B2 | 2/2012 | Assefa et al. | |
| 2003/0007718 A1* | 1/2003 | Bazylenko | G02B 6/12019 385/14 |
| 2003/0210725 A1* | 11/2003 | Prassas | H01S 3/063 372/50.1 |
| 2004/0008405 A1 | 1/2004 | Pelouch et al. | |
| 2004/0197065 A1* | 10/2004 | Haase | G02B 6/122 385/131 |
| 2005/0047739 A1 | 3/2005 | Parker et al. | |
| 2006/0263024 A1 | 11/2006 | Dong et al. | |
| 2011/0200292 A1 | 8/2011 | Filgas | |
| 2012/0219026 A1 | 8/2012 | Saracco et al. | |
| 2012/0225767 A1 | 9/2012 | Imholt et al. | |
| 2013/0142481 A1* | 6/2013 | Rockwell | G02B 6/02009 385/33 |
| 2014/0112616 A1 | 4/2014 | Numata | |
| 2014/0140659 A1 | 5/2014 | Demaray | |
| 2014/0268309 A1 | 9/2014 | Strohkendl | |
| 2014/0294341 A1* | 10/2014 | Hatori | G02B 6/12 385/14 |
| 2014/0307305 A1 | 10/2014 | Deri et al. | |
| 2014/0309717 A1 | 10/2014 | Gustavsson | |

OTHER PUBLICATIONS

International Search Report for International Application No. PCT/US2015/045151, filed Aug. 13, 2015, International Search Report dated Oct. 23, 2015 and mailed Nov. 12, 2015 (3 pgs).

Jia, Yuechen, et al.; "Continuous wave ridge waveguide lasers in fetosecond laser micromachined ion irradated Nd: YAG single crystals"; Optical Materials Express; vol. 2; No. 5; May 1, 2010; pp. 657-660.

Wolfe, Daniel B. et al.; "Fabrication of planar optical waveguides by electrical microcontact printing"; Applied Physics Letters; vol. 84; No. 10; Mar. 8, 2004; pp. 1623-1625.

Written Opinion, of the International Searching Authority for International Application No. PCT/US2015/045143 filed Aug. 13, 2015, Written Opinion of the International Searching Authority mailed Nov. 2, 2015 (10 pgs.).

International Search Report for International Application No. PCT/US2015/045143, filed Aug. 13, 2015, International Search Report dated Oct. 23, 2015 and mailed Nov. 2, 2015 (4 pgs.).

Non-final Office action mailed May 16, 2015 in related U.S. Appl. No. 14/479,398, filed Jun. 24, 2016, inventor David M. Filgas (10 pgs.).

* cited by examiner

END PUMPED PWG WITH TAPERED CORE THICKNESS

CROSS-REFERENCE TO RELATED APPLICATIONS

This Patent Application claims the benefits of U.S. Provisional Patent Application Ser. No. 62/037,505, filed on Aug. 14, 2014 and entitled "Asymmetric PWG With Asymmetric Cooling," the entire content of which is hereby expressly incorporated by reference.

FIELD OF THE INVENTION

The present invention relates generally to planar waveguides (PWGs); and more particularly to an end pumped PWG with tapered core thickness.

BACKGROUND

An optical waveguide guides electromagnetic waves in the optical spectrum. Optical waveguides may be used as the transmission medium in optical communication systems. A waveguide can also be used as an optical amplifier, e.g. an Erbium-doped fiber amplifier. A planar waveguide (PWG) is a particular type of waveguide that guides an optical wave in only one transverse axis. A PWG has a planar, 3-layer sandwich geometry consisting of a higher refractive index middle (core) layer that is surrounded on both sides by lower refractive index cladding layers. A PWG typically has a high aspect ratio (e.g., 100:1 or more), i.e. thin in one transverse axis and wide in the other, and also possessing large flat surface areas that facilitate mounting and heat removal in certain configurations, e.g. PWG amplifiers. Light may be confined in the middle layer by total internal reflection since its refractive index is higher than the surrounding cladding layers. Guided modes of a PWG are excited by injecting light into one end of the core layer.

PWGs are often used in lasers, such as laser diodes. They are also used in many optical components, such as Mach-Zehnder interferometers and wavelength division multiplexers. The cavities of laser diodes are frequently constructed as rectangular optical waveguides.

A PWG amplifier is an optical amplifier that uses a waveguide to boost an optical signal, such as a laser beam. Amplification is typically obtained by stimulated emission of photons from dopant ions in a doped core of the PWG. Typically, the core has a constant doping level. A pump laser excites ions into a higher energy level from where they can transition via stimulated emission of a photon at the signal wavelength back to a lower energy level. The excited ions can also decay spontaneously (spontaneous emission) or even through nonradiative processes involving interactions with phonons of the glass matrix. These last two types of decay mechanisms compete with stimulated emission reducing the efficiency of light amplification. A major barrier to a high power laser gain medium (amplifier) is the maximum temperature along the device, which could lead to destruction or malfunctioning of the device. The temperature profile is at its peak where the pump light is input into the PWG. A high temperature gradient also leads to wavefront errors of the PWG. Power scaling is ultimately limited by thermal effects that are proportional to the peak heat load per unit length.

A wavefront is the locus of points having the same phase, i.e., a line or curve in two dimensions, or a surface for a wave propagating in three dimensions. Wavefront distortion in a high power PWG amplifier results from thermal gradients in the unguided transverse axis of a PWG. Minimizing these transverse gradients helps enable high beam quality operation at high output power. Conventional high power PWG lasers use symmetric structures with cooling methods applied to both sides of the PWG.

Planar waveguides have historically been fabricated with uniform core thickness and uniform cladding thickness. This leads to higher heating near the end(s) where pump power is coupled into an end-pumped PWG. Since the power scaling is fundamentally limited by thermal effects, devices with non-uniform heating cannot achieve the power scaling potential of devices with more uniform heating. Prior attempts to improve thermal uniformity have utilized doping gradients or segmented doping in the gain medium to improve thermal uniformity but methods of fabricating laser gain media with doping gradients are low in maturity and complex to implement.

SUMMARY

In some embodiments, the present invention is a PWG or a laser gain medium (amplifier) geometry that is optimized for scalability to weapon class power levels with simplified manufacturing. The invention achieves a highly uniform pump distribution in the gain medium without requiring doping level gradients (of the conventional schemes), which is difficult to manufacture. The core of the laser gain medium has a tapered configuration along its length.

In some embodiments, the present invention is a planar wave guide (PWG) having a first end for coupling to a light pump and a second end opposite to the first end. The PWG include a first cladding layer; a second cladding layer; and a uniformly doped core layer between the first cladding layer and the second cladding layer, wherein the core layer is tapered having a smaller thickness at the first end and a larger thickness at the second end, and wherein a ratio of the core thickness to thickness of the cladding layers is smaller at the first end and larger at the second end.

In some embodiments, the first cladding layer and the second cladding layer have the same thickness along a length of the PWG. In some embodiments, the first cladding layer has a larger thickness than the second cladding layer, at any point along a length of the PWG.

BRIEF DESCRIPTION OF THE DRAWINGS

These and other features, aspects, and advantages of the present invention will become better understood with regard to the following description, appended claims, and accompanying drawings.

DETAILED DESCRIPTION

In some embodiments, the present invention is a PWG with a tapered core configuration. In some embodiments, the PWG has a symmetric (overall) structure, in which tapering in the core is compensated by a reverse tapering of a cladding on one side. In some embodiments, the PWG has an asymmetric structure, in which the cladding on one side of its core is much thinner than the cladding on the opposite side of the core. In some embodiments, the present invention varies pump absorption rate along the length of the PWG, resulting in lower absorption rate near pump input and increasing rate along the length. Increasing the absorption rate balances decreasing pump power to achieve a relatively uniform total absorbed power per unit length.

The present invention employs a cooling mechanism that is optimized on both sides of the PWG. This way, the present invention minimizes slow axis thermal gradients. Also, by reducing the absorption of fluorescence on the thinner cladding side of the asymmetric PWG, the invention yields a substantial improvement in unguided axis wavefront error.

The PWG of the present invention may be used in an optical amplifier, a Mach-Zehnder interferometer, a wavelength division multiplexer, or laser weapon.

In some embodiments, the present invention uses a tapered core thickness and optionally a tapered cladding thickness to yield a variable core/clad ratio along the length of a planar waveguide gain medium. The cladding can be a constant thickness or can have a matching reverse taper so that the outer surfaces of the composite structure (core plus cladding) are parallel. This latter configuration keeps the pump light confinement constant along the length of the device. In some embodiments, the thinner cladding may be only a coating.

As a result, the PWG of the present invention does not require any variable doping in the core to achieve pump absorption uniformity, thus making it easier to fabricate. Moreover, the PWG of the present invention has a near constant pump beam numerical aperture (NA) along the length of the guide.

Figure 1:
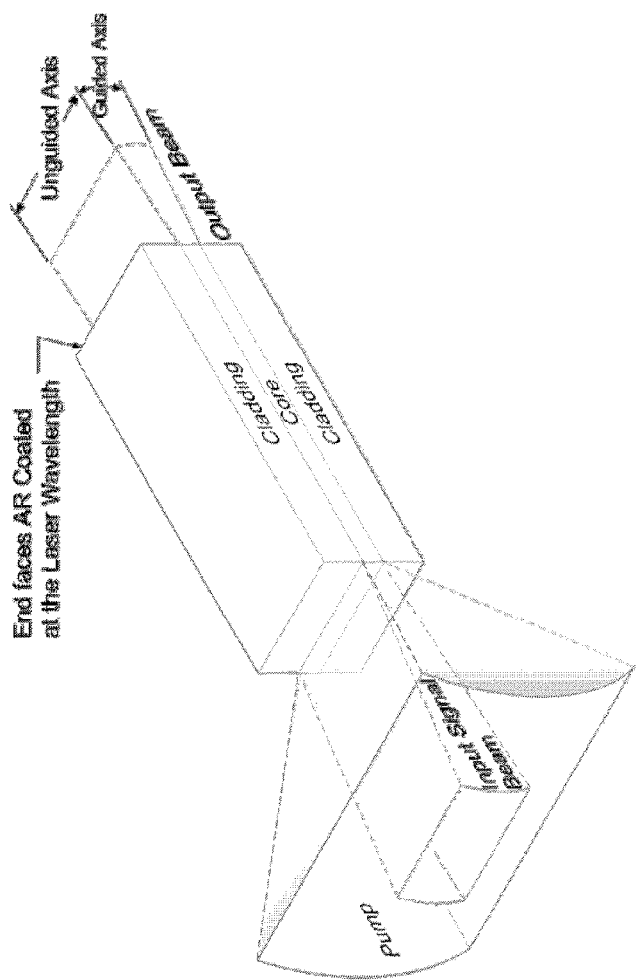
FIG. 1 shows a typical PWG geometry.

FIG. 1 shows a typical PWG geometry. As shown the input signal beam is introduced into the core layer at one end of the PWG (left side of the figure) and propagates through the core layer to the opposite end. The PWGs have a large surface area to volume ratio which enables efficient heat removal and low stress. High signal intensity enables high efficiency and high gain, and high aspect ratio enables simple, efficient pump coupling from, for example, affordable COTS laser diode arrays. Short length and large core area enable narrow-band operation at weapon-class powers. Design simplicity enables compact packaging with low size and weight.

Figure 2:
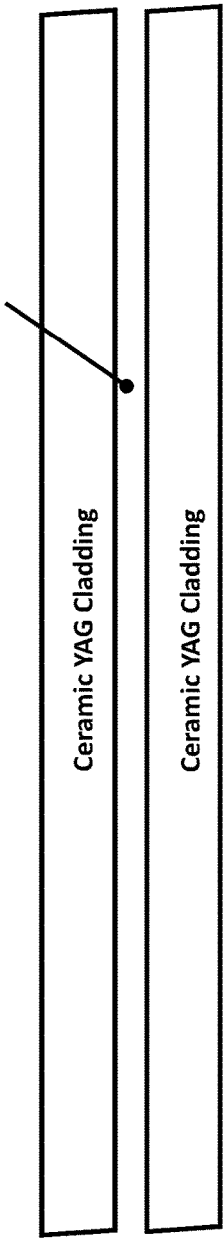
FIG. 2 shows a conventional three layer PWG.

FIG. 2 shows a conventional three layer PWG. As shown, a ceramic Yttrium aluminium garnet (YAG) composite core layer is sandwiched by two ceramic YAG claddings of the same thickness. This structure includes two large area bonds and a total of six bonds. Multiple core sections (plus edge bonds) achieve balanced thermal loads, however, this is still not suitable for many applications. The manufacturing of this typical PWG has a long lead time due to complexity of multiple bonds.

Figure 3:
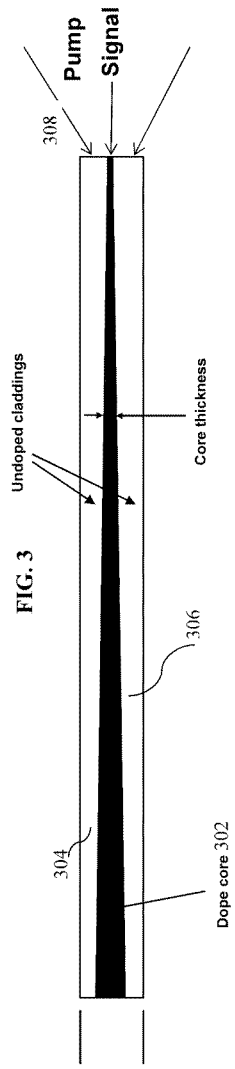
FIG. 3 shows an exemplary symmetric PWG with tapered core thickness, according to some embodiments of the present invention.

FIG. 3 shows an exemplary symmetric PWG with tapered core thickness, according to some embodiments of the present invention. As shown, the core 302, which is uniformly doped, has a smaller thickness at the pump input end 308 and tapers to a larger thickness towards the opposite end of the guide. The upper cladding 304 and the lower cladding 306 have a proportional inverse tapering so that the overall structure has a constant thickness. That is, the two claddings are symmetric with respect to each other having a larger thickness at the pump input end 308 and are tapered inverse to the tapered core thus having a smaller thickness towards the opposite end of the guide. This way, the core/clad thickness ratio is low at the pump input end, which results in lower pump light absorption at that end. This ratio increases along the length of the guide towards the other end since the core is getting thicker while the claddings are getting thinner along the length.

In some embodiments, the total thickness of the guide is constant along its length, as explained above. In some embodiments, the thickness of the two claddings is constant, i.e., the claddings are not tapered. This way, the total thickness of the device varies along the length. The total thickness varies only by a small amount since the change in the thickness of the core is not significant with respect to the cladding thickness. As a result, non-tapered claddings may be used thus facilitating their fabrication.

In some embodiments, the core thickness change is slow enough to act as an adiabatic taper allowing the beam to maintain single-mode beam quality in the guided axis. In other words, the guided light remains in the lowest-order waveguide mode all along the guide length, as long as the core thickness varies slow enough as a function of position in the guide.

Since the pump absorption rate is a function of the core/clad thickness ratio along the length of the PWG, this enables tailoring of the pump absorption along the length of the PWG. Some embodiments use a core thickness taper ratio of ~3:1. In some embodiments, the core thickness varies from 25 to 75 microns along the length of the PWG and the pump light makes two passes through the PWG (2-pass pumping). The resulting pump absorption profile keeps longitudinal variations in absorbed power to less than ~20%. This absorbed pump power uniformity is achieved while using a constant doping level in the core, thus facilitating the PWG fabrication process. The cladding can be a constant thickness and since the core thickness is small compared to the cladding thickness, there is minimal variation in the total thickness of the guide.

Alternatively, the cladding can have a matching reverse taper relative to the core so that the composite structure (core plus cladding) has a uniform thickness along its length. In some embodiments, the total thickness of the guide in the fast axis may be on the order of less than 1 mm to a few mm, and the length of the guide may be on the order of 10's to 100's of mm. Also in some embodiments, the average core thickness along the guide length may be on the order of 10's to 100's of microns with core thickness tapers (ratio of the core thickness on one end of the guide to the thickness on the opposite end) on the order of 2 to 10 times along the length of the guide.

By tailoring the core thickness, with the core thickness thinnest near the pump input end and thickest on the opposite end of the pump input, the invention achieves relatively uniform heating along the length of the device while being compatible with robust manufacturing processes.

Figure 4:
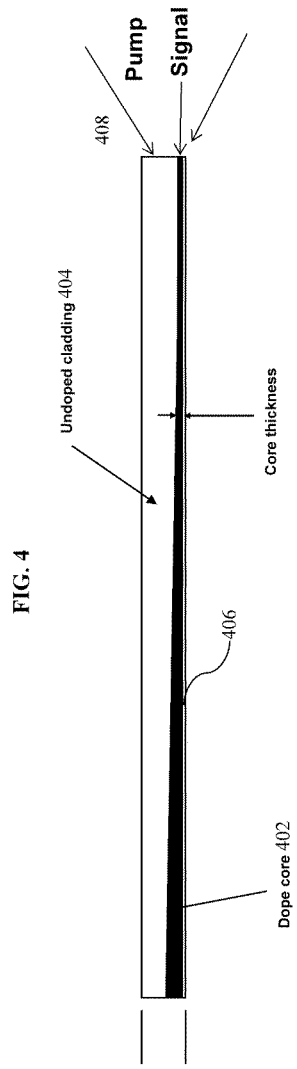
FIG. 4 shows an exemplary asymmetric PWG with tapered core thickness, according to some embodiments of the present invention.

FIG. 4 shows an exemplary asymmetric PWG with tapered core thickness, according to some embodiments of the present invention. As depicted, the core 402 (with a uniform doping) has a smaller thickness at the pump input end 408 and tapers to a larger thickness towards the other end of the guide. In these asymmetric embodiments, one of the claddings, for example, the upper cladding 404 is substantially thicker than the other (lower, in this case) cladding 406. That is, the two claddings are asymmetric with respect to each other. The lower cladding 406 is much thinner than the upper cladding 404 and may be merely a coating deposited on the core layer. That is, the asymmetric PWG includes a first cladding layer (here, the top layer), a second cladding layer (here, the bottom layer), where first cladding layer having a larger thickness than the second cladding layer.

In some embodiments, the upper cladding 404 has a proportional inverse tapering to make the overall structure with a constant thickness. That is, the upper cladding 404 has a larger thickness at the pump input end 408 and is tapered inversely to the tapered core and has a smaller thickness towards the other end of the guide. This way, the core/clad thickness ratio is small at the pump input end, which results in low pump light absorption at that end. This ratio increases along the length of the guide towards the other end since the core is getting thicker while the claddings are getting thinner along the length.

In some embodiments, the total thickness of the guide is constant along its length. In other embodiments, the thickness of the upper cladding is constant, i.e., the upper cladding is not tapered. This way, the total thickness of the device varies along the length by a small amount since the change in the thickness of the core is not significant with respect to the thickness of the upper cladding. As a result, non-tapered upper cladding can be used which may facilitate its fabrication.

In some embodiments, one side of the core layer on the asymmetric tapered guide is generally coated with a uniform layer of material that serves as an evanescent wave (e-wave) coating. The coating layer is typically a few microns thick. In these embodiments, only the (thick) cladding on the other side of the core plays a role in the core/clad thickness ratio variation.

In some embodiments, the cooling on the thinner cladding side is configured to minimize absorption of fluorescence, for example, by a transparent or mirror-like thermal interface. The cooling on the thicker cladding side is configured to provide a controlled amount of absorption of fluorescence in order to minimize excessive non-guided amplified spontaneous emission (ASE) and eliminate any parasitic oscillations within the gain medium which can result in gain clamping or in general degrade the performance of the PWG amplifier.

Figure 5:
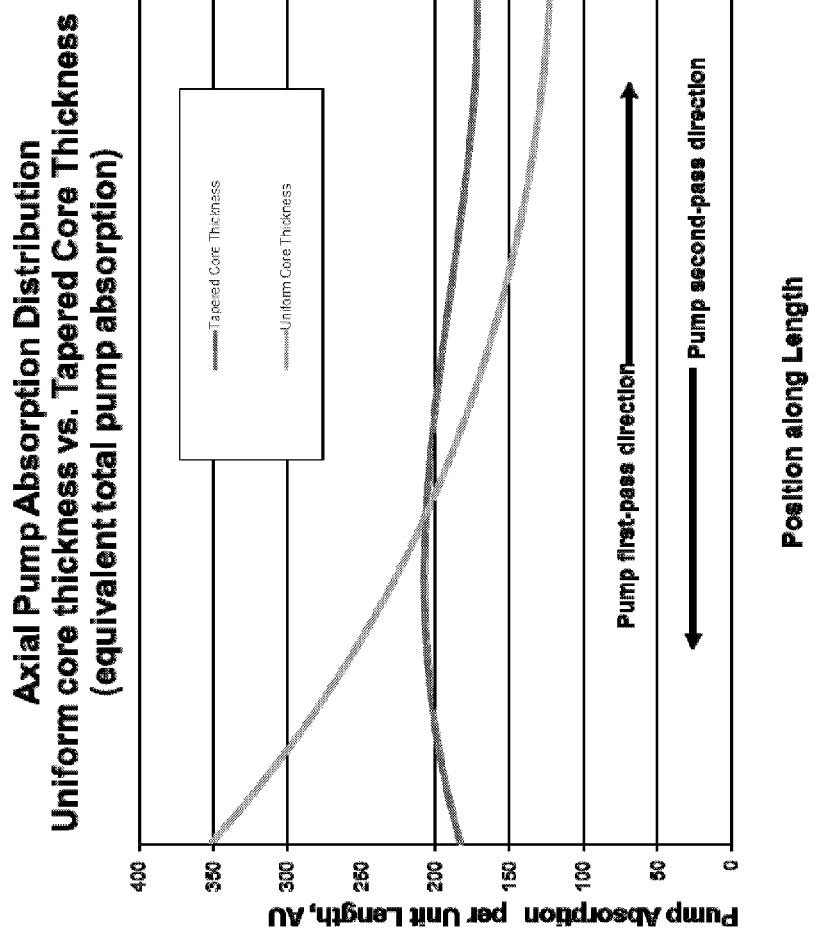
FIG. 5 depicts a graph for axial pump absorption distribution for a tapered core according to some embodiments of the present invention, and a uniform core thickness according to conventional PWG configuration.

FIG. 5 depicts a graph for axial pump absorption distribution for a tapered core according to some embodiments of the present invention, and a uniform core thickness according to conventional PWG configuration. As illustrated, for the conventional devices with uniform core thickness, the pump absorption (per unit length) is the highest at the pump input end and decreases along the length of the device towards the other end. In this example, the pump absorption for the conventional devices with uniform core varies from 350 AU at the pump end to about 120 AU at the other end, that is, a range of 230 AU.

In contrast, for the devices of the present invention with tapered core thickness, the pump absorption is almost uniform along the length of the device with a maximum variation between 205 AU and 180 AU. That is, the invention achieves relatively uniform heating along the length of the device while being easier to be fabricated.

It will be recognized by those skilled in the art that various modifications may be made to the illustrated and other embodiments of the invention described above, without departing from the broad inventive step thereof. It will be understood therefore that the invention is not limited to the particular embodiments or arrangements disclosed, but is rather intended to cover any changes, adaptations or modifications which are within the of the invention as defined by the appended claims.

What is claimed is:

1. A planar wave guide (PWG) having a first end for coupling to a light pump and a second end opposite to the first end comprising:
   a first cladding layer;
   a second cladding layer; and
   a uniformly doped core layer between the first cladding layer and the second cladding layer, wherein the core layer is tapered having a smaller thickness at the first end and a larger thickness at the second end, wherein the first cladding layer has a larger thickness than the second cladding layer, at any point along a length of the PWG, and wherein the second cladding layer is formed by coating a corresponding side of the core layer with a uniform layer of material that serves as an evanescent wave (e-wave) coating.

2. The PWG of claim 1, wherein the first cladding layer is proportionally tapered along the length of the PWG and having a larger thickness at the first end and a smaller thickness at the second end and the second cladding layer has a constant thickness along the length of the PWG to form the PWG with a uniform overall thickness along the length.

3. The PWG of claim 1, wherein the first cladding layer and the second cladding layer have a constant same thickness along the length of the PWG to form the PWG with a varying overall thickness along the length proportional to the varying thickness of the core layer.

4. The PWG of claim 1, wherein the core thickness has a taper ratio of 3:1 from one end to the other end of the PWG.

5. The PWG of claim 1, wherein the core thickness varies from about 25 microns at the first end to about 75 microns at the second end.

6. The PWG of claim 1, wherein the first cladding layer is proportionally tapered along the length of the PWG having a larger thickness at the first end and a smaller thickness at the second end oppositely proportional to the thickness of the core layer and the second cladding layer has a constant thickness along the length of the PWG to form the PWG with a uniform overall thickness along its length.

7. The PWG of claim 1, wherein the first cladding layer and the second cladding layer each have a constant thickness along the length of the PWG to form the PWG with a varying overall thickness along the length proportional to the varying length of the core layer.

8. An optical amplifier including the PWG of claim 1.

9. A Mach-Zehnder interferometer including the PWG of claim 1.

10. A wavelength division multiplexer including the PWG of claim 1.

11. A laser weapon including the PWG of claim 1.

* * * * *